*US011270424B2*

United States Patent
Borer (10) Patent No.: US 11,270,424 B2
(45) Date of Patent: Mar. 8, 2022

(54) DEVICE AND CORRESPONDING METHHOD FOR CALCULATING VIDEO QUALITY INFORMATION OF A VIDEO SEQUENCE

(71) Applicant: Rohde & Schwarz GmbH & Co. KG, Munich (DE)

(72) Inventor: Silvio Borer, Zuchwil (CH)

(73) Assignee: Rohde & Schwarz GmbH & Co. KG, Munich (DE)

( * ) Notice: Subject to any disclaimer, the term of this patent is extended or adjusted under 35 U.S.C. 154(b) by 136 days.

(21) Appl. No.: 16/588,256

(22) Filed: Sep. 30, 2019

(65) Prior Publication Data

US 2020/0410659 A1 Dec. 31, 2020

(30) Foreign Application Priority Data

Jun. 28, 2019 (EP) ..................................... 19183146

(51) Int. Cl.
*G06T 7/00* (2017.01)

(52) U.S. Cl.
CPC .............. *G06T 7/0002* (2013.01); *G06T 7/97* (2017.01); *G06T 2207/10016* (2013.01); *G06T 2207/30168* (2013.01)

(58) Field of Classification Search
CPC ..................... G06T 7/0002; G06T 7/97; G06T 2207/10016; G06T 2207/30168; G06K 9/00711; G06K 9/036
See application file for complete search history.

(56) References Cited

U.S. PATENT DOCUMENTS 8,494,251 B2 * 7/2013 Camus ................. H04N 13/296
382/154
2012/0269425 A1 * 10/2012 Marchesotti ........... G06N 20/00
382/159

FOREIGN PATENT DOCUMENTS

WO 2012162806 A1 12/2012
WO 2016146038 A1 9/2016

OTHER PUBLICATIONS

Liu et al., "Image Quality Assessment Based on Gradient Similarity", published in IEEE Transactions on Image Processing, vol. 21, No. 4, Apr. 2012, 14 pages.
European Office Action for related European Patent Application No. 19183146.0-1207 dated Dec. 19, 2019, 2015, 7 Pages.
Malathi et al., "A Comparative Analysis on Image Quality Assessment for Real Times Satellite Images", Published in Indian Journal of Science and Technology, vol. 9 (34), Sep. 2016, 12 pages.
(Continued)

*Primary Examiner* — Brenda C Bernardi
(74) *Attorney, Agent, or Firm* — Ditthavong, Steiner & Mlotkowski (57) ABSTRACT

A device for calculating video quality information of a video sequence is provided. The device comprises a data acquisition unit for acquiring at least one video frame with respect to the video sequence, and a calculation unit connected to the data acquisition unit. In this context, the calculation unit is configured to calculate at least one video quality indicator value on the basis of a non-linear transformation with the aid of at least one absolute gradient value with respect to the at least one video frame and at least one lateral average value with respect to the at least one video frame.

15 Claims, 3 Drawing Sheets

(56) References Cited

OTHER PUBLICATIONS

Wainwright et al., "Natural Image Statistics and Divisive Normalization: Modeling Nonlinearities and Adaption in Cortical Neurons", published in a chapter in Statistical Theories of the Brain, 2001, 22 pages.

Laparra et al., "Divisive Normalization Image Quality Metric Revisited", published in Journal of the Optical Society of America A, vol. 27, Issue 4, pp. 2010, 31 pages.

Schwarz et al., "Natural signal statistics and sensory gain control", published in Nature Neuroscience, vol. 4, No. 8, Aug. 2001, 11 pages.

* cited by examiner

DEVICE AND CORRESPONDING METHHOD FOR CALCULATING VIDEO QUALITY INFORMATION OF A VIDEO SEQUENCE

PRIORITY

This application claims priority of European patent application EP 19183146.0 filed on Jun. 28, 2019, which is incorporated by reference herewith.

FIELD OF THE INVENTION

The invention relates to a device for calculating video quality information of a video sequence and a corresponding method.

BACKGROUND OF THE INVENTION

Generally, in times of an increasing number of videos viewed on the basis of streaming technologies, there is a growing need of a device and a method for calculating video quality information of a video sequence especially in order to verify that the respective video to view has the desired quality. For instance, there may especially be a need for testing, monitoring or optimizing the subjectively perceived quality of a received video signal that results from a reference video signal having been transmitted via a telecommunication network in conjunction with an offered video service.

WO 2016/146038 A1 relates to a system and method for codebook construction and use thereof in image quality assessment. A codebook including a plurality of code words is provided. Each one of the plurality of code words has a reference score relating to image quality. A test image is acquired. One or more feature vectors are extracted from the test image based on statistical independence between neighboring divisive normalization transform coefficients of the test image. A score is generated based on a comparison between the extracted feature vectors of the test image and at least some of the plurality of code words in the codebook and the corresponding reference scores of the code words.

Accordingly, there is a need to provide a device and a method for calculating an improved video quality information of a video sequence, thereby ensuring a high accuracy and efficiency.

SUMMARY OF THE INVENTION

According to a first aspect of the invention, a device for calculating video quality information of a video sequence is provided. The device comprises a data acquisition unit for acquiring at least one video frame with respect to the video sequence, and a calculation unit connected to the data acquisition unit. In this context, the calculation unit is configured to calculate at least one video quality indicator value R on the basis of a non-linear transformation with the aid of at least one absolute gradient value E with respect to the at least one video frame and at least one lateral average value S with respect to the at least one video frame. Advantageously, not only a high accuracy but also a high efficiency can be ensured.

Further advantageously, the comparison of at least one video quality indicator value R with a reference value Rref may especially be an indicator of video quality as perceived by a human viewer.

It is noted that the at least one video quality indicator value R may especially imply an array comprising video quality indicator values preferably with respect to the respective pixels of the at least one video frame.

It is further noted that the at least one absolute gradient value E may especially imply an array comprising absolute gradient values preferably with respect to the respective pixels of the at least one video frame.

It is additionally noted that the at least one lateral average value S may especially imply an array comprising lateral average values preferably with respect to the respective pixels of the at least one video frame.

According to a first preferred implementation form of the first aspect of the invention, the calculation unit is configured to calculate the at least one video quality indicator value R on the basis of the following formula: $R=(\max(0, (E-S)))/(E+S+c(E))$. Advantageously, both accuracy and efficiency can further be increased. In this context, $\max(0, (E-S))$ denotes the maximum of zero and the difference between the at least one absolute gradient value E and the at least one lateral average value S.

Additionally, $c(E)$ denotes a function depending on the at least one absolute gradient value E, preferably depending depending on the respective absolute gradient values over the at least one video frame as a whole.

According to a second preferred implementation form of the first aspect of the invention, the calculation unit is configured to calculate the function $c(E)$ on the basis of the following formula: $c(E)=0.5*(c0+\text{mean}(E))$. Advantageously, for instance, calculation efficiency can further be increased. In this context c0 denotes a constant, and mean(E) denotes the mean value of the at least one absolute gradient value E, preferably of the respective absolute gradient values over the at least one video frame as a whole.

According to a further preferred implementation form of the first aspect of the invention, the calculation unit is configured to calculate at least one gradient value with respect to the at least one video frame on the basis of a derivative in horizontal direction with respect to an attribute A of the at least one video frame. Advantageously, for instance, accuracy can further be increased.

Further advantageously and preferably, the attribute A of the at least one video frame may especially comprise or be a luminance value Y of the least one video frame, at least one of chrominance values Cb, Cr of the at least one video frame, or any combination thereof. It is noted that the attribute A of the at least one video frame may especially imply an array comprising attribute values preferably with respect to the respective pixels of the at least one video frame.

According to a further preferred implementation form of the first aspect of the invention, the calculation unit is configured to calculate at least one gradient value with respect to the at least one video frame on the basis of a derivative in vertical direction with respect to an attribute A of the at least one video frame. Advantageously, for example, calculation accuracy can further be increased.

Further advantageously and preferably, as already mentioned above, the attribute A of the at least one video frame may especially comprise or be a luminance value Y of the least one video frame, at least one of chrominance values Cb, Cr of the at least one video frame, or any combination thereof.

According to a further preferred implementation form of the first aspect of the invention, the calculation unit is configured to calculate at least one difference of horizontally adjacent pixels of the at least one video frame with respect to an attribute A of the at least one video frame on the basis of the following formula:

$$H(i,j)=phi(A(i,j)-A(i,(j-1))).$$

In this context, H(i,j) denotes a horizontal result value for the pixel at (i,j)-position of the at least one video frame, A(i,j) denotes the attribute of the at least one video frame for the pixel at (i,j)-position of the at least one video frame, and phi( ) denotes a non-linear strictly monotonic function.

Advantageously and preferably, as already mentioned above, the attribute A of the at least one video frame may especially comprise or be a luminance value Y of the least one video frame, at least one of chrominance values Cb, Cr of the at least one video frame, or any combination thereof.

It is further noted that it might be particularly advantageous if the attribute A is replaced by the luminance value Y of the at least one video frame, which leads to the following formula:

$$H(i,j)=phi(Y(i,j)-Y(i,(j-1))).$$

In this context, Y(i,j) denotes the luminance value of the at least one video frame for the pixel at (i,j)-position of the at least one video frame.

According to a further preferred implementation form of the first aspect of the invention, the calculation unit is configured to calculate at least one difference of vertically adjacent pixels of the at least one video frame with respect to an attribute A of the at least one video frame on the basis of the following formula:

$$V(i,j)=phi(A(i,j)-A((i-1),j)).$$

In this context, V(i,j) denotes a vertical result value for the pixel at (i,j)-position of the at least one video frame, A(i,j) denotes the attribute of the at least one video frame for the pixel at (i,j)-position of the at least one video frame, and phi( ) denotes a non-linear strictly monotonic function.

Advantageously, as already mentioned above, the attribute A of the at least one video frame may especially comprise or be a luminance value Y of the least one video frame, at least one of chrominance values Cb, Cr of the at least one video frame, or any combination thereof.

It is further noted that it might be particularly advantageous and preferred if the attribute A is replaced by the luminance value Y of the at least one video frame, which leads to the following formula:

$$V(i,j)=phi(Y(i,j)-Y((i-1),j)).$$

In this context, Y(i,j) denotes the luminance value of the at least one video frame for the pixel at (i,j)-position of the at least one video frame.

According to a further preferred implementation form of the first aspect of the invention, the calculation unit is configured to apply the non-linear strictly monotonic function phi( ) at each position of the at least one video frame especially in order to rescale the respective values to a fixed range, preferably to the range from −1 to 1. Advantageously, for instance, efficiency can further be increased.

According to a further preferred implementation form of the first aspect of the invention, the calculation unit is configured to calculate the at least one absolute gradient value E on the basis of a function depending on the derivative in horizontal direction and the derivative in vertical direction. Advantageously, for example, accuracy can further be increased.

According to a further preferred implementation form of the first aspect of the invention, the calculation unit is configured to calculate the at least one absolute gradient value E on the basis of the following formula:

$$E=sqrt(H*H+V*V).$$

In this context, sqrt( ) denotes the square root, H denotes the horizontal result value for a pixel of the at least one video frame, and V denotes the vertical result value for a pixel of the at least one video frame.

It is noted that the horizontal result value H may especially imply an array comprising horizontal result values preferably with respect to the respective pixels of the at least one video frame.

It is further noted that the vertical result value V may especially imply an array comprising vertical result values preferably with respect to the respective pixels of the at least one video frame.

According to a further preferred implementation form of the first aspect of the invention, with the aid of a small displacement vector of fixed length (di,dj) in direction of the gradient at position (i,j) of the at least one video frame, the calculation unit is configured to calculate the lateral average value S(i,j) at position (i,j) on the basis of the following formula:

$$S(i,j)=0.5*(E(i+di,j+dj)+E(i-di,j-dj)).$$

Advantageously, for instance, both accuracy and efficiency can further be increased. In this context, E(i,j) denotes the absolute gradient value for the pixel at (i,j)-position of the at least one video frame.

According to a further preferred implementation form of the first aspect of the invention, the calculation unit is configured to calculate the at least one video quality indicator value R in each of the at least one video frame for each position. Advantageously, for example, calculation accuracy can further be increased.

According to a further preferred implementation form of the first aspect of the invention, the device further comprises an output unit. In this context, the output unit is configured to output the at least one video quality indicator value R to a file especially for further processing. In addition to this or as an alternative, the output unit is configured to display the at least one video quality indicator value R on a screen especially for further processing. Advantageously, for instance, efficiency can further be increased.

According to a further preferred implementation form of the first aspect of the invention, the calculation unit is configured to aggregate the at least one video quality indicator value R and to compare the aggregated at least one video quality indicator value R to at least one aggregated reference video quality indicator value Rref. Advantageously, for example, not only accuracy but also efficiency can further be increased.

It is noted that the at least one aggregated reference video quality indicator value Rref may especially imply an array comprising aggregated reference video quality indicator values preferably with respect to the respective pixels of the at least one video frame.

Further advantageously, the aggregated reference video quality indicator values may be computed by calculating the aggregated video quality indicator values for the respective undistorted high quality source video.

Alternatively, the aggregated reference video quality indicator values may be computed on the basis of the aggregated video quality indicator values calculated on a reference set of undistorted videos.

Further advantageously, an indicator based on the above-mentioned comparison of R with Rref may especially be used as an estimate of the video quality preferably rated by an average human viewer.

According to a second aspect of the invention, a method for calculating video quality information of a video sequence is provided. The method comprises the steps of acquiring at least one video frame with respect to the video sequence, and calculating at least one video quality indicator value R on the basis of a non-linear transformation with the aid of at least one absolute gradient value E with respect to the at least one video frame and at least one lateral average value S with respect to the at least one video frame. Advantageously, not only a high accuracy but also a high efficiency can be ensured.

Further advantageously and preferably, the at least one video quality indicator value R may especially be an indicator of video quality as perceived by a human viewer.

It is noted that the at least one video quality indicator value R may especially imply an array comprising video quality indicator values preferably with respect to the respective pixels of the at least one video frame.

It is further noted that the at least one absolute gradient value E may especially imply an array comprising absolute gradient values preferably with respect to the respective pixels of the at least one video frame.

It is additionally noted that the at least one lateral average value S may especially imply an array comprising lateral average values preferably with respect to the respective pixels of the at least one video frame.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Figure 1:
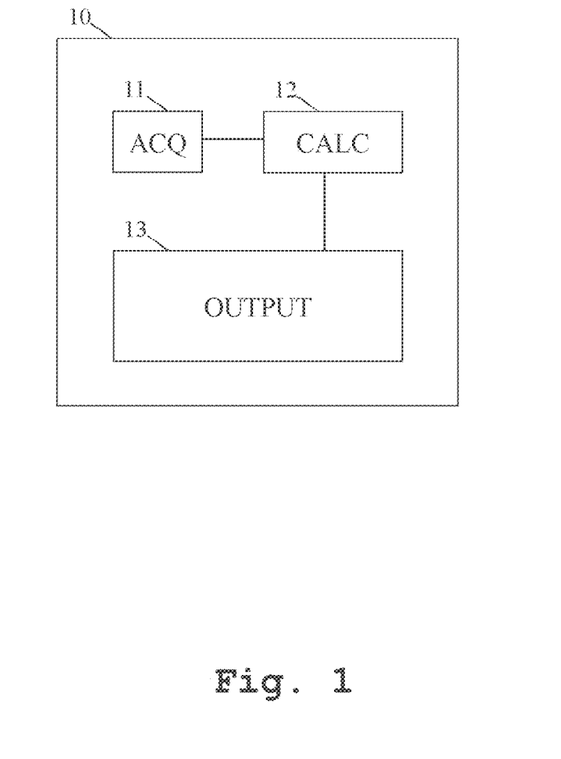
FIG. 1 shows an exemplary embodiment of an inventive device according to the first aspect of the invention.

With respect to FIG. 1, a block diagram of an exemplary embodiment of a device 10 for calculating video quality information of a video sequence is shown.

According to FIG. 1, the device 10 comprises a data acquisition unit 11 for acquiring at least one video frame with respect to the video sequence, a calculation unit 12 connected to the data acquisition unit 11, and an output unit 13 connect to the calculation unit 12.

In this context, the calculation unit 12 is configured to calculate at least one video quality indicator value R on the basis of a non-linear transformation with the aid of at least one absolute gradient value E with respect to the at least one video frame and at least one lateral average value S with respect to the at least one video frame.

It is noted that the non-linear transformation may especially comprise a sparse edge representation by lateral inhibition, which will be explained below with respect to FIG. 2.

Furthermore, the calculation unit 12 is configured to calculate the at least one video quality indicator value R on the basis of the following formula:

$$R = (\max(0, (E-S)))/(E+S+c(E)). \qquad (1)$$

In this context, $\max(0, (E-S))$ denotes the maximum of zero and the difference between the at least one absolute gradient value E and the at least one lateral average value S, and $c(E)$ denotes a function depending on the at least one absolute gradient value E, preferably depending depending on the respective absolute gradient values over the at least one video frame as a whole.

Moreover, the calculation unit 12 is configured to calculate the above-mentioned function c(E) on the basis of the following formula:

$$c(E) = 0.5*(c0 + \text{mean}(E)). \qquad (2)$$

In this context, c0 denotes a constant, and mean(E) denotes the mean value of the at least one absolute gradient value E, preferably of the respective absolute gradient values over the at least one video frame as a whole.

It is noted that the calculation unit 12 may be configured to calculate at least one gradient value with respect to the at least one video frame on the basis of a derivative in horizontal direction with respect to an attribute A of the at least one video frame.

It is further noted that the calculation unit 12 may be configured to calculate at least one gradient value with respect to the at least one video frame on the basis of a derivative in vertical direction with respect to an attribute A of the at least one video frame.

Furthermore, the calculation unit 12 is configured to calculate at least one difference of horizontally adjacent pixels of the at least one video frame with respect to an attribute A, preferably a luminance value Y, of the at least one video frame on the basis of the following formula:

$$H(i,j) = phi(A(i,j) - A(i,(j-1))), \text{ preferably} \qquad (3)$$

$$H(i,j) = phi(Y(i,j) - Y(i,(j-1))). \qquad (4)$$

In this context, H(i,j) denotes a horizontal result value for the pixel at (i,j)-position of the at least one video frame, A(i,j), preferably Y(i,j), denotes the attribute, preferably the luminance value, of the at least one video frame for the pixel at (i,j)-position of the at least one video frame, and phi( ) denotes a non-linear strictly monotonic function.

Moreover, the calculation unit 12 is configured to calculate at least one difference of vertically adjacent pixels of the at least one video frame with respect to an attribute A, preferably a luminance value Y, of the at least one video frame on the basis of the following formula:

$$V(i,j) = phi(A(i,j) - A((i-1),j)), \text{preferably} \qquad (5)$$

$$V(i,j) = phi(Y(i,j) - Y((i-1),j)). \qquad (6)$$

In this context, V(i,j) denotes a vertical result value for the pixel at (i,j)-position of the at least one video frame, A(i,j), preferably Y(i,j), denotes the attribute, the luminance value, of the at least one video frame for the pixel at (i,j)-position of the at least one video frame, and phi( ) denotes a non-linear strictly monotonic function.

It is noted that it might be particularly advantageous if the calculation unit 12 is configured to apply the non-linear strictly monotonic function phi( ) at each position of the at least one video frame especially in order to rescale the respective values to a fixed range, preferably to the range from −1 to 1.

Further advantageously, the calculation unit 12 may be configured to calculate the at least one absolute gradient value E on the basis of a function depending on the derivative in horizontal direction and the derivative in vertical direction.

Moreover, the calculation unit 12 is configured to calculate the at least one absolute gradient value E on the basis of the following formula:

$$E = \text{sqrt}(H*H + V*V). \quad (7)$$

In this context, sqrt( ) denotes the square root, H denotes the horizontal result value for a pixel of the at least one video frame, and V denotes the vertical result value for a pixel of the at least one video frame.

It might be particularly advantageous if the calculation unit 12 is configured to calculate the at least one video quality indicator value R in each of the at least one video frame for each position.

Furthermore, the above-mentioned output unit 13 is configured to output the at least one video quality indicator value R to a file especially for further processing.

In addition to this or as an alternative, the output unit 13 is configured to display the at least one video quality indicator value R on a screen especially for further processing.

It is further noted that the calculation unit 12 may be configured to aggregate the at least one video quality indicator value R and to compare the aggregated at least one video quality indicator value R to at least one aggregated reference video quality indicator value Rref.

Furthermore, with the aid of a small displacement vector of fixed length (di,dj) in direction of the gradient at position (i,j) of the at least one video frame, the calculation unit 12 is configured to calculate the lateral average value S(i,j) at position (i,j) on the basis of the following formula:

$$S(i,j) = 0.5*(E(i+di,j+dj) + E(i-di,j-dj)). \quad (8)$$

In this context, E(i,j) denotes the absolute gradient value for the pixel at (i,j)-position of the at least one video frame.

Accordingly, an average signal is computed along the line perpendicular to the respective edge, especially defined by the gradient vector.

Figure 2:
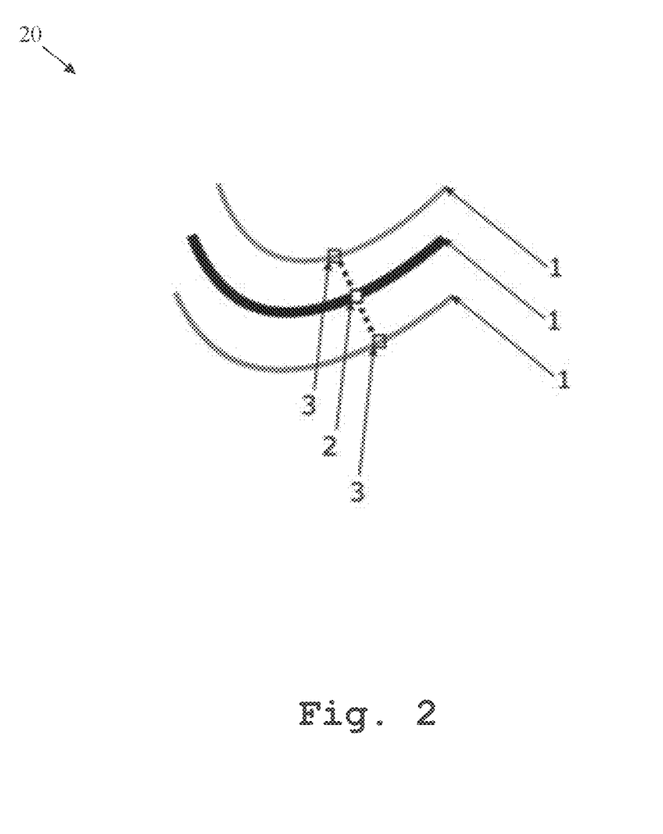
FIG. 2 shows an exemplary schematic video frame.

In this context, edges in a frame (absolute value of the gradient) are exemplarily denoted by reference sign 1 of FIG. 2 which illustrates an exemplary video frame in an abstracted and schematic manner.

In addition to this, reference sign 2 of FIG. 2 denotes an exemplary (i,j)-position, whereas reference sign 3 denotes exemplary positions of lateral inhibition in accordance with the above-mentioned sparse edge representation by lateral inhibition.

Figure 3:
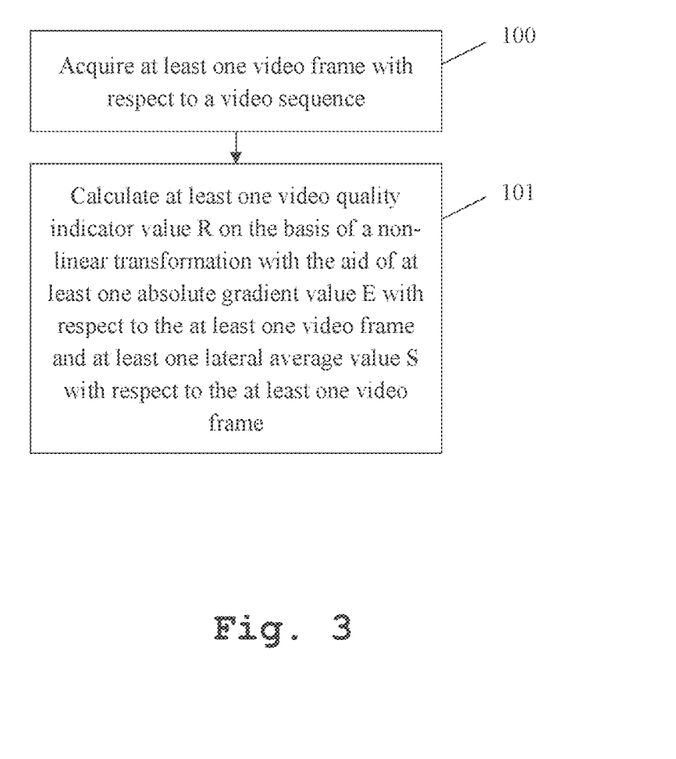
FIG. 3 shows a flow chart of an embodiment of the second aspect of the invention.

Finally, FIG. 3 shows a flow chart of an embodiment of the inventive method for calculating video quality information of a video sequence. In a first step 100, at least one video frame with respect to the video sequence is acquired. Then, in a second step 101, at least one video quality indicator value R is calculated on the basis of a non-linear transformation with the aid of at least one absolute gradient value E with respect to the at least one video frame and at least one lateral average value S with respect to the at least one video frame.

It might be particularly advantageous if the method further comprises the step of calculating the at least one video quality indicator value R on the basis of the above-mentioned formula (1):

$$R = (\max(0,(E-S)))/(E+S+c(E)).$$

In this context, as already mentioned above, max(0,(E−S)) denotes the maximum of zero and the difference between the at least one absolute gradient value E and the at least one lateral average value S, and c(E) denotes a function depending on the at least one absolute gradient value E, preferably depending depending on the respective absolute gradient values over the at least one video frame as a whole.

Furthermore, the method may comprise the step of calculating the function c(E) on the basis of the above-mentioned formula (2):

$$c(E) = 0.5*(c0 + \text{mean}(E)).$$

In this context, as already mentioned above, c0 denotes a constant, and mean(E) denotes the mean value of the at least one absolute gradient value E, preferably of the respective absolute gradient values over the at least one video frame as a whole.

It is further noted that the method may comprise the step of calculating at least one gradient value with respect to the at least one video frame on the basis of a derivative in horizontal direction with respect to an attribute A of the at least one video frame.

Moreover, the method may further comprise the step of calculating at least one gradient value with respect to the at least one video frame on the basis of a derivative in vertical direction with respect to an attribute A of the at least one video frame.

It might be particularly advantageous if the method further comprises the step of calculating at least one difference of horizontally adjacent pixels of the at least one video frame with respect to an attribute A of the at least one video frame on the basis of the above-mentioned formula (3):

$$H(i,j) = \text{phi}(A(i,j) - A(i,(j-1))).$$

In this context, as already mentioned above, H(i,j) denotes a horizontal result value for the pixel at (i,j)-position of the at least one video frame, A(i,j) denotes the attribute of the at least one video frame for the pixel at (i,j)-position of the at least one video frame, and phi( ) denotes a non-linear strictly monotonic function.

It is noted that the above-mentioned formula (4) analogously applies for the method.

Furthermore, the method may comprise the step of calculating at least one difference of vertically adjacent pixels of the at least one video frame with respect to an attribute A of the at least one video frame on the basis of the above-mentioned formula (5):

$$V(i,j) = \text{phi}(A(i,j) - A((i-1),j)).$$

In this context, as already mentioned above, V(i,j) denotes a vertical result value for the pixel at (i,j)-position of the at least one video frame, A(i,j) denotes the attribute of the at least one video frame for the pixel at (i,j)-position of the at least one video frame, and phi( ) denotes a non-linear strictly monotonic function.

It is noted that the above-mentioned formula (6) analogously applies for the method.

It is further noted that it might be particularly advantageous if the method comprises the step of applying the non-linear strictly monotonic function phi( ) at each position of the at least one video frame especially in order to rescale the respective values to a fixed range, preferably to the range from −1 to 1.

Moreover, the method may comprise the step of calculating the at least one absolute gradient value E on the basis of a function depending on the derivative in horizontal direction and the derivative in vertical direction.

It is further noted that the method may comprise the step of calculating the at least one absolute gradient value E on the basis of the above-mentioned formula (7):

$$E = \text{sqrt}(H*H + V*V).$$

In this context, as already mentioned above, sqrt( ) denotes the square root, H denotes the horizontal result value for a pixel of the at least one video frame, and V denotes the vertical result value for a pixel of the at least one video frame.

Furthermore, with the aid of a small displacement vector of fixed length (di,dj) in direction of the gradient at position (i,j) of the at least one video frame, the method may comprise the step of calculating the lateral average value S(i,j) at position (i,j) on the basis of the above-mentioned formula (8):

$$S(i,j)=0.5*(E(i+di,j+dj)+E(i-di,j-dj)).$$

In this context, as already mentioned above, E(i,j) denotes the absolute gradient value for the pixel at (i,j)-position of the at least one video frame.

Advantageously, the method may comprise the step of calculating the at least one video quality indicator value R in each of the at least one video frame for each position.

It is further noted that the method may comprise the step of outputting the at least one video quality indicator value R to a file especially for further processing.

In addition to this or as an alternative, the method may comprise the step of displaying the at least one video quality indicator value R on a screen especially for further processing.

Moreover, the method may further comprise the step of aggregating the at least one video quality indicator value R and to compare the aggregated at least one video quality indicator value R to at least one aggregated reference video quality indicator value Rref.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What claimed is:

1. A device for calculating video quality information of a video sequence, the device comprising:
   a data acquisition unit, comprising circuitry, for acquiring at least one video frame with respect to the video sequence, and
   a calculation unit, comprising the circuitry, connected to the data acquisition unit,
   wherein the calculation unit is configured to calculate at least one video quality indicator value on the basis of a non-linear transformation using at least one absolute gradient value with respect to the at least one video frame and at least one lateral average value with respect to the at least one video frame, and
   wherein the calculation unit is configured to calculate at least one gradient value with respect to the at least one video frame on the basis of a derivative in horizontal direction with respect to an attribute A of the at least one video frame.

2. The device according to claim 1,
   wherein the calculation unit is configured to calculate at least one video quality indicator value R on the basis of the following formula:

$$R=(\max(0,(E-S)))/(E+S+c(E)),$$

wherein max(0,(E−S)) denotes the maximum of zero and the difference between the at least one absolute gradient value E and the at least one lateral average value S, and
   wherein c(E) denotes a function depending on the at least one absolute gradient value E, depending on the respective absolute gradient values over the at least one video frame as a whole.

3. The device according to claim 2,
   wherein the calculation unit is configured to calculate the function c(E) on the basis of the following formula:

$$c(E)=0.5*(c0+\text{mean}(E)),$$

wherein c0 denotes a constant, and
   wherein mean(E) denotes the mean value of the at least one absolute gradient value E, of the respective absolute gradient values over the at least one video frame as a whole.

4. The device according to claim 1,
   wherein the calculation unit is configured to calculate at least one difference of horizontally adjacent pixels of the at least one video frame with respect to an attribute A of the at least one video frame on the basis of the following formula:

$$H(i,j)=phi(A(i,j)-A(i,(j-1))),$$

wherein H(i,j) denotes a horizontal result value for the pixel at (i,j)-position of the at least one video frame,
   wherein A(i,j) denotes the attribute of the at least one video frame for the pixel at (i,j)-position of the at least one video frame, and
   wherein phi( ) denotes a non-linear strictly monotonic function.

5. The device according to claim 1,
   wherein the calculation unit is configured to calculate at least one difference of vertically adjacent pixels of the at least one video frame with respect to an attribute A of the at least one video frame on the basis of the following formula:

$$V(i,j)=phi(A(i,j)-A((i-1),j)),$$

wherein V(i,j) denotes a vertical result value for the pixel at (i,j)-position of the at least one video frame,
   wherein A(i,j) denotes the attribute of the at least one video frame for the pixel at (i,j)-position of the at least one video frame, and
   wherein phi( ) denotes a non-linear strictly monotonic function.

6. The device according to claim 4,
   wherein the calculation unit is configured to apply the non-linear strictly monotonic function phi( ) at the position of each pixel of the at least one video frame in order to rescale the respective values to a fixed range, to the range from −1 to 1.

7. The device according to claim 1,
   wherein the calculation unit is configured to calculate the at least one absolute gradient value E on the basis of a function depending on the derivative in horizontal direction and the derivative in vertical direction.

8. The device according to claim 4,
wherein the calculation unit is configured to calculate the at least one absolute gradient value E on the basis of the following formula:

$$E = \operatorname{sqrt}(H*H + V*V),$$

wherein sqrt( ) denotes the square root,
wherein H denotes the horizontal result value for a pixel of the at least one video frame, and
wherein V denotes the vertical result value for a pixel of the at least one video frame.

9. The device according to claim 1,
wherein using a displacement vector of fixed length (di,dj) in direction of the gradient at position (i,j) of the at least one video frame, the calculation unit (12) is configured to calculate the lateral average value S(i,j) at position (i,j) on the basis of the following formula:

$$S(i,j) = 0.5*(E(i+di, j+dj) + E(i-di, j-dj)),$$

wherein E(i,j) denotes the absolute gradient value for the pixel at (i,j)-position of the at least one video frame.

10. The device according to claim 1,
wherein the calculation unit is configured to calculate at least one video quality indicator value R in each of the at least one video frame for a position of each pixel.

11. The device according to claim 1,
wherein the device further comprises an output unit comprising the circuitry,
wherein the output unit is configured to output at least one video quality indicator value R to a file for further processing, and/or
wherein the output unit is configured to display the at least one video quality indicator value R on a screen for further processing.

12. The device according to claim 1,
wherein the calculation unit is configured to aggregate a plurality of video quality indicator values R and to compare the aggregated video quality indicator values R to at least one aggregated reference video quality indicator value Rref.

13. A device for calculating video quality information of a video sequence, the device comprising:
a data acquisition unit, comprising circuitry, for acquiring at least one video frame with respect to the video sequence, and
a calculation unit, comprising the circuitry, connected to the data acquisition unit,
wherein the calculation unit is configured to calculate at least one video quality indicator value on the basis of a non-linear transformation using at least one absolute gradient value with respect to the at least one video frame and at least one lateral average value with respect to the at least one video frame, and
wherein the calculation unit is configured to calculate at least one gradient value with respect to the at least one video frame on the basis of a derivative in vertical direction with respect to an attribute A of the at least one video frame.

14. A method for calculating video quality information of a video sequence, the method comprising the steps of:
acquiring at least one video frame with respect to the video sequence,
calculating at least one video quality indicator value on the basis of a non-linear transformation using at least one absolute gradient value with respect to the at least one video frame and at least one lateral average value with respect to the at least one video frame, and
calculating at least one gradient value with respect to the at least one video frame on the basis of a derivative in horizontal direction with respect to an attribute A of the at least one video frame.

15. A method for calculating video quality information of a video sequence, the method comprising the steps of:
acquiring at least one video frame with respect to the video sequence,
calculating at least one video quality indicator value on the basis of a non-linear transformation using at least one absolute gradient value with respect to the at least one video frame and at least one lateral average value with respect to the at least one video frame, and
calculating at least one gradient value with respect to the at least one video frame on the basis of a derivative in vertical direction with respect to an attribute A of the at least one video frame.

\* \* \* \* \*